United States Patent [19]

Lenoski

[11] Patent Number: 5,005,118

[45] Date of Patent: Apr. 2, 1991

[54] METHOD AND APPARATUS FOR MODIFYING MICRO-INSTRUCTIONS USING A MACRO-INSTRUCTION PIPELINE

[75] Inventor: Daniel E. Lenoski, Mountain View, Calif.

[73] Assignee: Tandem Computers Incorporated, Cupertino, Calif.

[21] Appl. No.: 36,726

[22] Filed: Apr. 10, 1987

[51] Int. Cl.⁵ .............. G06F 9/26; G06F 9/302; G06F 9/305; G06F 9/38
[52] U.S. Cl. .................. 364/200; 364/231.8; 364/244.2; 364/244.6; 364/247.6; 364/258; 364/259; 364/262.7; 364/263; 364/270
[58] Field of Search ... 364/200 MS File, 900 MS File, 364/200, 900

[56] References Cited

U.S. PATENT DOCUMENTS

| | | | |
|---|---|---|---|
| 4,080,648 | 3/1978 | Asano et al. | 364/200 |
| 4,168,523 | 9/1979 | Chari et al. | 364/200 |
| 4,376,976 | 3/1983 | Lahti | 364/200 |
| 4,430,708 | 2/1984 | Isaman | 364/200 |
| 4,488,224 | 12/1984 | Ippolito et al. | 364/200 |
| 4,495,563 | 1/1985 | McDonough | 364/200 |
| 4,550,369 | 10/1985 | Rokutanda et al. | 364/200 |
| 4,631,663 | 12/1986 | Chilinski et al. | 364/200 |
| 4,674,063 | 6/1987 | Sato | 364/900 |
| 4,677,545 | 6/1987 | Blahut | 364/200 |

Primary Examiner—Archie E. Williams, Jr.
Assistant Examiner—Emily Y. Chan
Attorney, Agent, or Firm—Townsend and Townsend

[57] ABSTRACT

A method and mechanism operate for shortening the execution time of certain macro-instructions by looking at both a present macro-instruction and a next macro-instruction. The invention includes two, interrelated aspects for accomplishing this. First, a first operation of a next macro-instruction is performed concurrently with a last operation of a current macro-instruction. Second, the next macro-instruction is decoded to determine the minimum number of clock cycles it requires. If this minimum number is below a specified number, the micro operations of the present instruction are modified to perform appropriate set-up operations for the next macro-instruction to enable it to be completed in the computed minimum number of clock cycles.

1 Claim, 2 Drawing Sheets

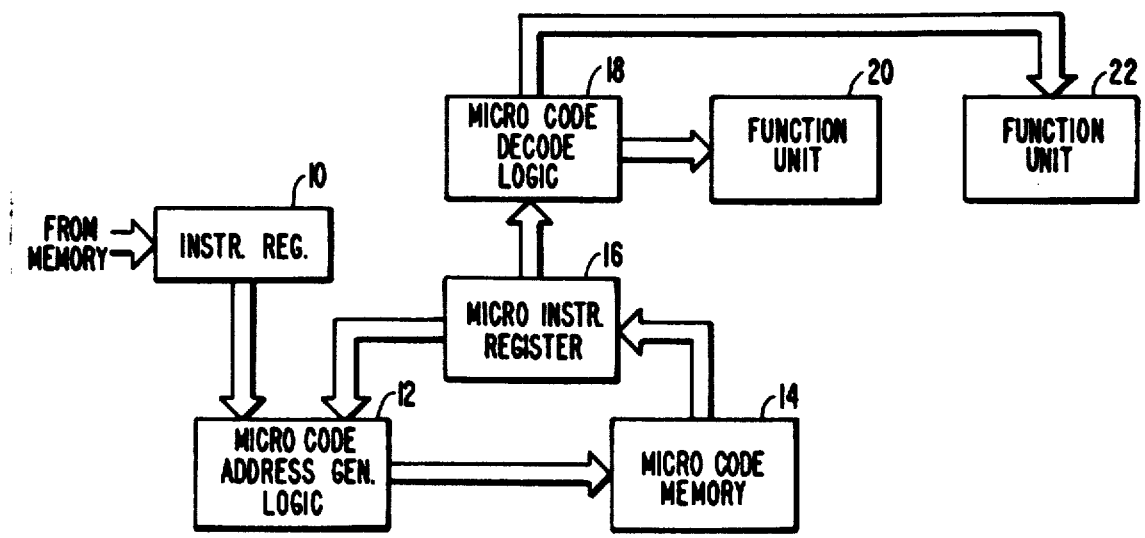
FIG._1. (PRIOR ART)
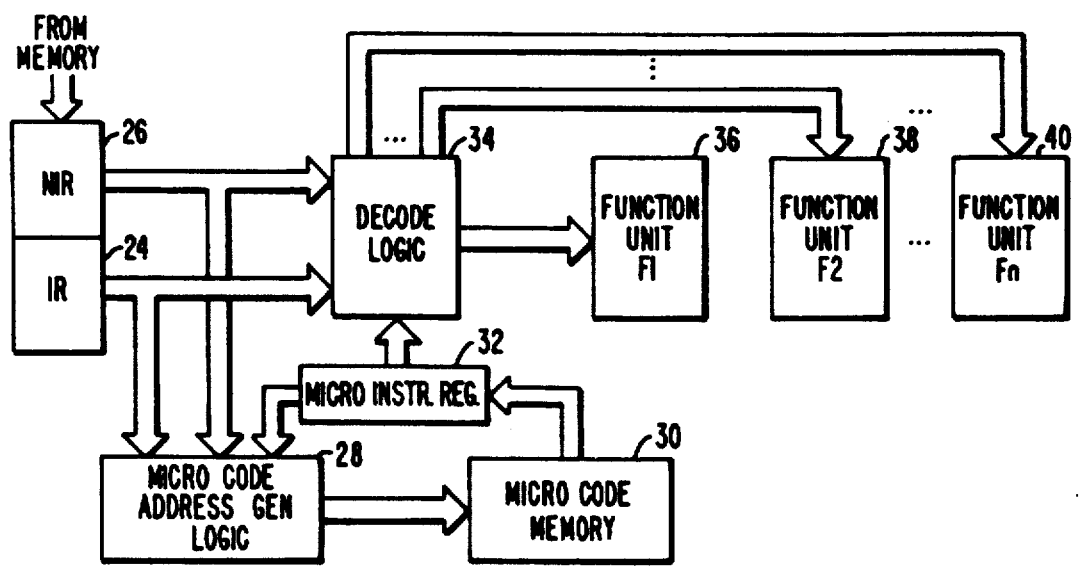
FIG._2.

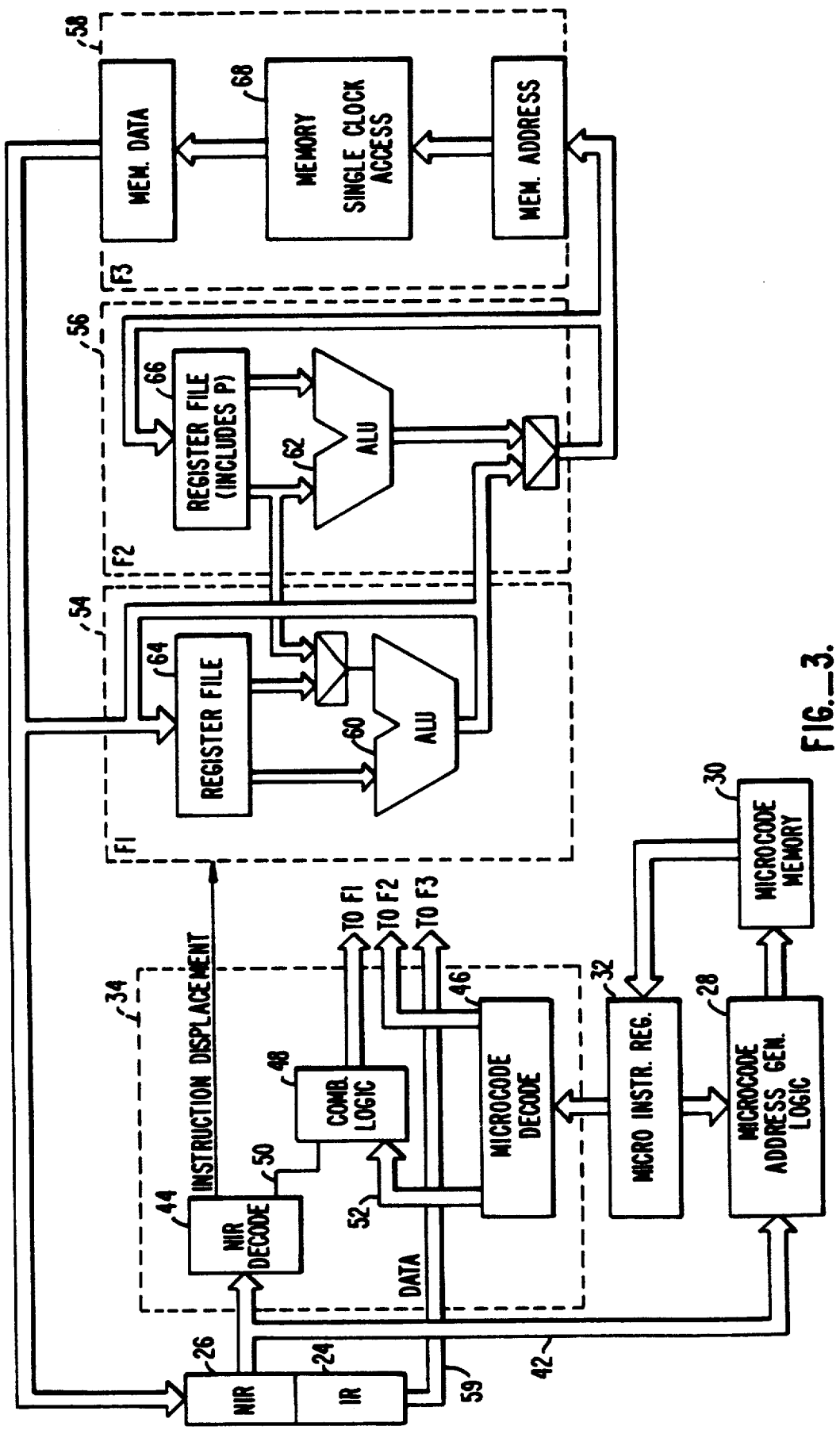
FIG._3.

METHOD AND APPARATUS FOR MODIFYING MICRO-INSTRUCTIONS USING A MACRO-INSTRUCTION PIPELINE

BACKGROUND

The present invention relates to the execution of macro instructions by a central processing unit utilizing sequences of microcode instructions.

In a typical modern computer, a program is executed by fetching an instruction from memory and placing it in an instruction register. The instruction is then decoded to point to a starting address or series of addresses in a microcode memory. The microcode memory provides the operations which make up the instruction. The various operations from the microcode memory are sequentially placed into a micro instruction register where they are decoded to produce control signals for executing the operations. These control signals may enable an access of memory, the placement of operands into an arithmetic logic unit, the combination of operands in an arithmetic logic unit, etc. After all the microcode operations for a particular macro-instruction have been executed, a new macro-instruction is fetched from memory and the process is repeated.

Once the macro-instruction has been decoded, there is typically no interaction between the micro coded operations and the macro-instruction except for instances in which the macro-instruction includes a data operand or a register specifier for a data operand.

In efforts to speed computer operation, attempts have been made to shorten the number of clock cycles required for the macro instructions. One method of doing this involves performing redundant microcode operations and storing the results of these operations in separate registers where necessary. The next macro-instruction can then be decoded to determine whether it requires these operations. If it does, the precomputed results can be used. If not, the result of the redundant operation is thrown out. Unfortunately, this method requires a significant amount of additional hardware and often results in wasted operations. This type of scheme is employed in the TXP and VLX processors manufactured by Tandem Computers, Inc.

Another method involves processing multiple microcode instructions at one time to do some operations not requiring the ALU in parallel with ALU operations. The advantages of increased speed and simplified control logic are balanced by the disadvantage of requiring more hardware and making microcode branches slower.

Another method involves simply hardwiring certain macro-instruction operations so that microcode does not have to be accessed at all for such operations. The obvious disadvantage of this method is that the hardwired circuit becomes dedicated to that function and can't be used for other purposes.

U.S. Pat. No. 4,312,034 describes yet another method for reducing the amount of time required to execute a macro-instruction. Referring to FIG. 15 of that patent, a macro-instruction register (IRD) and a ROM output register (microcode) are factored into a ROM address whose outputs control an ALU and condition codes. Thus, the macro-instruction itself is used to control the ALU and condition codes instead of relying on the microcode instructions entirely. Thus, for example, to do an add or subtract operation the microcode would simply do the same fetch operation with the controller looking directly to the macro-instruction to determine whether to add or subtract.

SUMMARY OF THE INVENTION

The present invention provides a method and mechanism for shortening the execution time of certain macro-instructions by looking at both a present macro-instruction and a next macro-instruction. The invention includes two, interrelated aspects for accomplishing this. First, a first operation of a next macro-instruction is performed concurrently with a last operation of a current macro-instruction. Second, the next macro-instruction is decoded to determine the minimum number of clock cycles it requires. If this minimum number is below a specified number, the micro operations of the present instruction are modified to perform appropriate set-up operations for the next macro-instruction to enable it to be completed in the computed minimum number of clock cycles.

In the preferred embodiment, the processor is provided with two computational units which allow the execution of two operations concurrently. These operations can be classified into two groups. The first group is referred to as macro-sequencing operations and include operations that are performed for all macro-instructions or are performed for all macro-instructions of a certain type (i.e., all arithmetic instructions requiring an operand). For example, these instructions include incrementing the program counter, fetching a next instruction from memory, calculating the address of an operand for the next instruction and fetching the operand for the next instruction. The second type of instruction which is executed in parallel covers micro operations which are dependent upon the particular macro-instruction. For example, this type of operation includes addition, subtraction and other arithmetic operations or specific movement of operands between registers. In a typical instruction, four operations of the first group are required, thus requiring four clock cycles. However, often only three operations of the second group are required, or in some instances, only two. Accordingly, by performing the first operation of the first group for a next instruction concurrently with the last operation of the first group for a current instruction, if the next instruction requires only three operations of the second group, the next operation can then be performed in three clock cycles. If the next instruction in fact requires four operations of the second group, the performance of its first operation of its first group by the previous instruction cycle is simply redundant. This procedure is followed because it is simpler to redo the operation when needed rather than store the result for the next clock cycle. The invention differs from the redundancy found in the prior art because the redundancy depends upon the number of operations specified by the next macro-instruction.

In the second aspect of the invention, the next instruction in the next instruction register is decoded to determine the number of clock cycles required. If the number is less than a specified number of clock cycles, the operations of the current instruction are modified accordingly. For a specific example, if the next instruction does not require an operand, no operand address calculation and no operand fetch is required. Accordingly, these operations, which are performed by the present instruction for the next instruction, are modified so that they become another operation, such as incrementing the program counter. This can be done by changing the coding value of the operation at the output of the microcode register. Thus, when the next instruction is itself executed, it need not perform the steps required for incrementing the program counter and can instead perform the macro-sequencing steps of calculating and fetching the operand for the next instruction, thus enabling the instruction to be executed in two clock cycles.

By using a combination of the redundancy aspect of the invention and the modifying of a micro operation, the average number of clock cycles required for the macro-instruction is reduced. This is accomplished with a minimal amount of hardware.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a typical prior art controller;

FIG. 2 is a block diagram of a controller according to the present invention; and FIG. 3 is a block diagram of the controller of FIG. 2 with a specific function unit arrangement for the logic functions.

DETAILED DESCRIPTION OF THE PREFERRED EMBODIMENT

FIG. 1 is a block diagram of a typical prior art processor. An instruction register 10 receives an instruction from memory which is decoded by microcode address generation logic 12 to produce addresses to a microcode memory 14. The instructions stored in microcode memory 14 are supplied to a micro-instruction register 16, which may itself affect the address of the next instruction in microcode memory 14. The instruction in micro-instruction register 16 is decoded by microcode decode logic 18. The decoded logic generates control signals which are supplied to function units 20 and 22. The function units perform the memory fetches, arithmetic operations, and other manipulations specified by the micro-instruction.

Because the processor of FIG. 1 has two function units, during any one clock cycle two operations may be performed concurrently. A typical macro-instruction sequence may require a number of macro-sequencing operations as well as micro operations which may be performed concurrently. The macro-sequencing operations would be operations which are done for all macro-instructions or for certain types of macro-instructions (i.e., arithmetic operations requiring the fetching of an operand), while other micro-instructions are dependent upon a particular macro-instruction (i.e., particular arithmetic operations). Thus, for example, function unit 20 of FIG. 1 could be performing a macro-sequencing operation (such as incrementing a program counter) while function unit 22 could be performing another operation, such as adding two operands. This parallel operation is shown in the following table for macro-instructions 0 and 1 where A, B, C and D represent macro-sequencing micro-instructions and w, x, y and z represent instruction-dependent micro operations.

TABLE 1

| Macro Instr. | Clock Cyc. | Operation | |
|---|---|---|---|
| 0 | 0 | A(0) | w(0) |
| 0 | 1 | B(0) | x(0) |
| 0 | 2 | C(0) | y(0) |
| 0 | 3 | D(0) | z(0) |
| 1 | 0 | A(1) | x(1) |
| 1 | 1 | B(1) | y(1) |
| 1 | 2 | C(1) | z(1) |
| 1 | 3 | D(1) | |

As can be seen from the above table, by doing operations in parallel, only four clock instructions are required for each macro-instruction. In the example shown, for macro-instruction 1, four macrolevel operations are required while only three instruction-dependent micro-operations are required. The present invention takes advantage of this feature of certain macro-instructions by adding a third function unit so that three operations can be performed in parallel.

The present invention has two aspects. The first aspect is the parallel performance of macro-sequencing operations. For most instruction-dependent micro-operations (w, x, y, z) the operations must be performed sequentially, and thus a time savings by parallel operation is not possible. However, often-times more than one macro-sequencing operation can be performed simultaneously. Accordingly, the present invention uses a third function unit to perform a first macro-sequencing operation of a next instruction concurrently with the last macro-sequencing operation of a first instruction. As can be seen in Table 2 below, this results in macro-instruction 1 of Table 1 requiring only three clock cycles to execute.

TABLE 2

| Macro Instr. | Clock Cyc. | Operation | | |
|---|---|---|---|---|
| 0 | 0 | A(0) | | w(0) |
| 0 | 1 | B(0) | | x(0) |
| 0 | 2 | C(0) | | y(0) |
| 0 | 3 | D(0) | A(1) | z(0) |
| 1 | 0 | B(1) | | x(1) |
| 1 | 1 | C(1) | | y(1) |
| 1 | 2 | D(1) | A(2) | z(1) |
| 2 | 0 | A(2) | | w(2) |
| 2 | 1 | B(2) | | x(2) |
| 2 | 2 | C(2) | | y(2) |
| 2 | 3 | D(2) | A(3) | z(2) |

As can be seen from Table 2, if a macro-instruction 2 requires four instruction-dependent micro operations (w, x, y, z), then step A(2) performed during macro-instruction 1 simply becomes redundant and is repeated. Alternately, step A(2) could simply be omitted from macro-instruction 2 with no macro-sequencing operation being performed during the first clock cycle, L-3.

The second aspect of the present invention involves looking at a next instruction and modifying the operations of the current instruction if the next instruction is less than a predetermined number. Referring to FIG. 2, both an instruction register 24 and a next instruction register 26 are provided to give a macro-instruction pipeline. These registers are coupled to microcode address generation logic 28, microcode memory 30 and micro-instruction register 32 in similar manner to the circuit of FIG. 1. However, rather than using simply microcode decode logic which only decodes micro-instruction register 32, a decode logic block 34 is used which takes inputs from the macro-instruction register as well as the micro-instruction register. Decode logic 34 looks at the contents of the next instruction register (NIR) 26 and, if it requires less than a certain number of clock cycles, modifies the code from micro-instruction register 32 to alter the control signals provided to function units 36 and 38-40 (F1, F2 through FN). Decode logic 34 looks at the next instruction in next instruction register 26 and determines how many clock cycles it could be done in. For instance, if a next instruction requires only instruction-dependent operations y and z, then it can be done in two clock cycles if macro-sequencing instruction A and B are performed during the current instruction. This can be done by doing A and B in parallel with C and D of the current instruction or, if C and D are not needed because of the nature of the next instruction, operations C and D can be modified to become operations A and B.

An example is where A and B relate to incrementing the program counter and C and D relate to calculating an operand address and fetching the operand for the next instruction. Where the next instruction has only two instruction-dependent operations (y, z), and does not require an operand, steps C and D being performed by the current instruction are unnecessary. Accordingly, steps C and D can be modified to become steps A and B for the next instruction. When the next instruction is executed, it can thus do its steps C and D concurrently with steps y and z.

Table 3 below shows the resulting sequence of operations where a current instruction 0 in instruction register 24 requires four clock cycles while a next instruction in NIR register 26 requires only two clock cycles. Decode logic 34 of FIG. 2 looks at the contents of NIR 26 and determines that only two clock cycles are required. Accordingly, it modifies operations C(0) and D(0) to become operations A(1) and B(1), respectively. Thus, when macro-instruction 1 is itself executed, since steps A and B have already been performed, it can perform steps C(1) and D(1) concurrently with instruction-dependent steps y(1) and z(1), thus enabling the instruction to be completed in only two clock cycles.

TABLE 3

| Macro Instr. | Clock Cyc. | Operation | | |
|---|---|---|---|---|
| 0 | 0 | A(0) | | w(0) |
| 0 | 1 | B(0) | | x(0) |
| 0 | 2 | [C(0)] | A(1) | y(0) |
| 0 | 3 | [D(0)] | B(1) | z(0) |
| 1 | 0 | C(1) | | y(1) |
| 1 | 1 | D(1) | | z(1) |
| 2 | 0 | A(2) | | w(2) |
| 2 | 1 | B(2) | | x(2) |
| 2 | 2 | C(2) | | y(2) |
| 2 | 3 | D(2) | | z(2) |

FIG. 3 shows a specific embodiment of the circuit of FIG. 2. In FIG. 3, the contents of next instruction register 26 are provided via a bus 42 to microcode address generation logic 28. A data bus 59 couples IR 24 to the function units to provide data to be operated on when appropriate. The decode logic 34 consists of a NIR decode circuit 44, microcode decode logic 46 and combination logic 48. NIR decode logic 44 determines whether a two cycle instruction is present in NIR 26 and, if so, presents a signal on a line 50 to decode logic 48. Decode logic 48 passes control signals 52 from microcode decode logic 46 if no signal is present on line 50. Otherwise, the signal on line 50 modifies the digital content of the control signals.

Three function units 54, 56 and 58 are utilized. Function units 54 and 56 contain arithmetic logic units 60 and 62, respectively. In addition, each contains a register file 64 or 66, respectively. Register file 66 includes the program counter. Function unit 58 is used to access memory 68.

The sequencing of instructions through the three function units is shown in Table 4 below.

TABLE 4

| Clock Cyc. | F1 | F2 | F3 |
|---|---|---|---|
| 0 | w(0) | A(0) | — |
| 1 | x(0) | — | B(0) |
| 2 | y(0) | C(0) or A(1) | — |
| 3 | z(0) | A(1) | D(0) or B(1) |

Table 4 shows a four clock cycle sequence which combines the redundancy of Table 2 and the macro-sequencing instruction modification of Table 3. In clock cycles L-1 and L, if the next instruction is a two cycle instruction, steps C(0) and D(0) are modified to become A(1) and B(1). During clock cycle L, while either step D(0) or B(1) is being performed in function unit F3, step A(1) is being performed in function unit F2. As can be seen, the operation in function unit F2 during clock cycle L will be redundant when the next instruction is a two clock instruction, and will be used only if the next instruction is a three-clock instruction. In addition, it can be seen that function unit F2 is not used during clock cycle L-2 and function unit F3 is not used during clock cycles L-3 and L-1. Accordingly, this gives added flexibility to the programming to enable instruction-dependent operations w, x and y to use two function units concurrently if necessary.

The actual operations A, B, C and D performed in the preferred embodiment and the modifications performed for a two tick (clock) cycle are set forth below.

A(0): Calculate the address of the macro program counter (P) plus 1. This is equal to the address of the present instruction plus 2.

B(0): Fetch the instruction from memory whose address was calculated in A. Store the address calculated in A to P.

C(0): If not two tick (NIR) then: Calculate the address (base + displacement) of the operand for the next instruction.

(Else A(1): calculate the address of the macro program counter (P) plus 1. This is equal to the address of the present instruction plus 3.)

Load the current instruction register (IR) with the instruction in the next instruction register (NIR) and the instruction fetched in B into NIR.

D(0): If not two tick (NIR) then: Fetch the operand for the next instruction, now in IR.

(Else B(1): Fetch the instruction from memory whose address was calculated in C. Store the address calculated in C to P.)

A(1): Calculate the address of the macro program counter (P) plus 1. This is equal to the address of the instruction 3 after the present one.

A(1) is the redundant operation which is done in parallel with D(0) for the sake of a three micro cycle macro instruction which might follow the present instruction. "Two tick (NIR)" is a decode of the next instruction register that indicates that the next instruction will be executed in two micro cycles. "Two tick (IR)" of D(0) reflects the movement of the next instruction into the instruction register during C(0). Because of this shift, NIR decode logic 44 includes a register for storing the portion of the next instruction needed for D(0). The above description does not include the instruction-dependent operations (x(0), y(0), etc.) that occur in parallel with the macro sequencing operations.

In a preferred embodiment, the macro-instructions have lengths of either two, three or four or more clock cycles. This results in six possible micro-instruction flows: four or more clock instructions, three clock instructions and two clock instructions which are followed by either two or more clock instructions or a two clock instruction. This instruction flow is as set forth in the following table.

TABLE 5

| | | Inst. 1 is > 2 Clocks | | | Inst. 1 is = 2 Clocks | | |
|---|---|---|---|---|---|---|---|
| ≧4 Clock Instruction | Clock Cyc. | Operation | | | Operation | | |
| | 0,L-3 | A(0), | | w(0) | A(0), | | w(0) |
| | 0,L-2 | B(0), | | x(0) | B(0), | | x(0) |
| | 0,L-1 | C(0), | | y(0) | A(1), | | y(0) |
| | 0,L | D(0), | A(1), | z(0) | B(1), | A(1), | z(0) |
| 3 Clock Instruction | −1,L | D(−1, | A(0), | z(−1) | D(−1, | A(0), | z(−1) |
| | 0,0 | B(0), | | x(0) | B(0), | | x(0) |
| | 0,1 | C(0), | | y(0) | A(1), | | y(0) |
| | 0,2 | D(0), | A(1), | z(0) | B(1), | A(1), | z(0) |
| 2 Clock Instruction | −1,L-1 | A(0), | | y(−1) | A(0), | | y(−1) |
| | −1,L | B(0), | A(0) | z(−1) | B(0), | A(0), | z(−1) |
| | 0,0 | C(0), | | y(0) | A(1), | | y(0) |
| | 0,1 | D(0), | A(1), | z(0) | B(1), | A(1), | z(0) |

As will be understood by those familiar with the art, the present invention may be embodies in other specific forms without departing from the spirit or essential characteristics thereof. For example, a next instruction which would require modification of the macro-sequencing operations of a current instruction could be other than a two clock cycle instruction. Alternately, instead of modifying the operations, other operations could be performed in parallel. Accordingly, the disclosure of the preferred embodiments of the invention is intended to be illustrative, but not limiting, of the scope of the invention which is set forth in the following claims.

What is claimed is:

1. An apparatus for executing instructions in a controller having at least first and second function units which each include an arithmetic logic unit, comprising:

a macro-instruction register;

a next macro-instruction register coupled to said macro-instruction register;

first logic means, coupled to one of said instruction registers, for generating control signals to concurrently execute, during a single clock cycle, first and second operations in said first and second function units, respectively, said first operation being used to carry out a first macro-instruction in said first macro-instruction register and said second operation being performed to carry out a next macro-instruction, and for using the result of said second operation during the execution of said next macro-instruction if said next macro-instruction has a number of operations less than a predetermined number and otherwise re-executing said second operation;

second logic means for decoding said next macro-instruction to determine whether less than said predetermined number of operations are required;

wherein one of said first and second operations is a memory access operation and said first logic means includes a first logic stage for providing access to a memory, a second logic stage having a first arithmetic logic unit for performing arithmetic operations on data provided from at least one of said first and next macro-instructions and said memory, and a third logic stage having a second arithmetic logic unit for performing arithmetic operations on data provided from at least one of said first and next macro-instructions and said memory, at least two of said first, second and third logic stages being concurrently operated for a portion of said first and next macro-instructions.

* * * * *